(12) United States Patent
Weinman, Jr.

(10) Patent No.: US 7,752,403 B1
(45) Date of Patent: Jul. 6, 2010

(54) METHODS AND SYSTEMS FOR SECURE DISPERSED REDUNDANT DATA STORAGE

(75) Inventor: Joseph Bernard Weinman, Jr., Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 1516 days.

(21) Appl. No.: 10/405,710

(22) Filed: Apr. 1, 2003

(51) Int. Cl.
*G06F 13/00* (2006.01)

(52) U.S. Cl. ....................... 711/162; 711/161

(58) Field of Classification Search ........................ None
See application file for complete search history.

(56) References Cited

U.S. PATENT DOCUMENTS

| | | | | |
|---|---|---|---|---|
| 5,408,633 | A * | 4/1995 | Katsumura et al. | 711/115 |
| 5,864,854 | A * | 1/1999 | Boyle | 707/10 |
| 7,457,933 | B2 * | 11/2008 | Pferdekaemper et al. | 711/170 |
| 2002/0002658 | A1 * | 1/2002 | Okayasu | 711/137 |
| 2003/0014523 | A1 * | 1/2003 | Teloh et al. | 709/226 |
| 2003/0188218 | A1 * | 10/2003 | Lubbers et al. | 714/5 |
| 2004/0024975 | A1 * | 2/2004 | Morishita et al. | 711/147 |

* cited by examiner

*Primary Examiner*—Mardochee Chery
(74) *Attorney, Agent, or Firm*—Fay Kaplun & Marcin, LLP

(57) ABSTRACT

Systems and methods are disclosed for providing and maintaining secure distributed randomly redundant data storage.

7 Claims, 6 Drawing Sheets

METHODS AND SYSTEMS FOR SECURE DISPERSED REDUNDANT DATA STORAGE

CROSS REFERENCE TO RELATED APPLICATIONS

N/A

BACKGROUND OF THE INVENTION

The present invention relates to systems and methods for data storage and protection and more specifically to systems and methods for creating, maintaining and updating geographically dispersed secure redundant data storage architectures and facilities.

Data has increasingly become a critical asset for businesses of all kinds. Data such as financial transactions such as stock trades or check clearing, customer records and account status, inventory and supply chain information, medical records, and so forth are the lifeblood of many businesses, and corruption or loss of such data can cause significant financial loss, penalties, fines, reduction in customer satisfaction or market share. In the extreme, even bankruptcy or total business failure can result from such data loss.

Over the past years, a number of technologies, architectures, and strategies have evolved to protect data. For example, one such strategy is local RAID (Redundant Array of Independent Disks) mirroring or parity protection, which protects against hardware failure, for example a disk head crash, on a single hard disk drive unit. However, such local protection strategies cannot protect against loss of a building or data center, such as might occur during a hurricane, flood, fire, tornado, earthquake, or the like.

To protect against such catastrophic disasters, the concept of remote mirroring was developed and implemented. Briefly, remote mirroring uses a first site and a second site located sufficiently far away, typically 20-25 miles or more, which are connected by a network. An original copy of the data at the first site may be "snapshotted" and then copied to the second site over the network. Also, once two copies, or instances, of the data exist, updates to the first copy are also applied to the second copy, through a variety of techniques providing lesser or higher degrees and guarantees that both copies are totally identical, including recently applied updates, typically referred to as synchronous, semi-synchronous, and asynchronous mirroring. By maintaining two copies of the data, it greatly reduces the probability that a single event such as a tornado would destroy both copies, offering a higher degree of protection against loss of data.

In more recent history, terrorist attacks and threats have highlighted another type of scenario not previously anticipated. Rather than the random threat posed by a hurricane or other natural disaster, this new threat type is that of a directed, intelligent and premeditated type able to plan so as to maximize the negative impact of actions against institutions such as banks, brokerages, and clearinghouses. Similarly, threats to data integrity may come from an internal source such as a disgruntled employee who may have access to internal procedures, systems and devices.

When protecting data, two locations are clearly insufficient, because it is easy to target both locations. Although it is common to try to shield general information regarding such locations, e.g., by using small signs or no signs, windowless buildings, and the like, a determined attacker can easily gain such information by surveying locations, talking to industry insiders, bribing former IT employees, or the like.

However, simply multiplying the number of locations, e.g., from two to four, while clearly dramatically increasing the cost of protection, may not greatly enhance the protection against loss from a determined attacker with inside information.

What is needed then is an economical and effective system and method for protecting data against loss from a variety of external factors and forces as discussed above.

BRIEF SUMMARY OF THE INVENTION

The present invention relates to systems, methods and devices for establishing, maintaining and updating secure dispersed data storage sites. In one embodiment, the present invention is a method comprising receiving a data item for storage, determining a replication count for the data item, storing instances of the data item in a plurality of randomly selected storage sites within a collection of storage sites, the plurality of randomly selected storage sites equal to the determined replication count; and intermittently varying the location of instances of the data item within one or more storage sites within the collection of storage sites.

In another embodiment, the present invention is a method comprising storing, for at least one data item a plurality of instances within a plurality of storage sites, relocating one or more instances of the at least one data item from one or more of the storage sites; and performing incremental updates to all instances of the at least one data item, wherein the incremental updates are performed in a manner which does not conflict with relocating the one or more instances of the data item.

In yet another embodiment, the present invention is a method comprising creating a primary copy of a data object, copying the data object to a plurality of alternate sites, selecting one or more of the copied data objects and re-locating the one or more selected data objects to a new site In still yet another embodiment, the invention comprises a large number of sites which are capable of storing data, and transferring data among themselves. After a data object is created, a replication count n is determined, and the data object is copied to n sites, selected at random. In an alternate embodiment, additionally from then on, any given copy of any given data object may be shifted, possibly at a random interval, from a site containing the data object to a site having capacity to store the data object. In the event of the loss of a site or the loss of an instance of a data object at a site, the data object may optionally be recreated at a new site by copying from the primary copy of the object or one of the copies at another site.

In the present invention, an attacker or external force attempting to completely eliminate the data object has to attack and destroy a large number of sites simultaneously, a very difficult proposition. In a preferred embodiment, each site maintains a large number of data objects, ideally from a substantial number of individual stakeholders. Consequently, the cost attributable to a given stakeholder is proportional to the number of copies of the data maintained, not the number of sites. Additionally, some of these sites may be inactive as regards active copying and movement of data objects, and therefore are decoy sites. They may have similar equipment, network access, and the like as active sites, but may not be in use for relocating data. In some embodiments, some of the capacity in a given site may be used for other purposes, thus expanding the number of sites and increasing the degree of protection. Note that one or more of the sites may in fact be mobile, i.e., they may in practice be a ship, aircraft, satellite, or mounted on a land vehicle.

DETAILED DESCRIPTION OF THE INVENTION

FIG. 1 illustrates an embodiment of a system of the present invention for securing data in a dispersed randomized fashion. System 100 consists of a number of sites 110x, shown here as sites 110a, 110b, 11c, through 110n, where "n" may be any real number such that the number of sites may vary depending of the requirements of system. Sites 110x are physical locations, typically geographically dispersed from one another, though it is contemplated that two or more of the sites may be proximally located. Many, but not necessarily all sites 110x include the ability to store data such as via, e.g., magnetic disk, solid state disk, holographic memory, magnetic tape, rewritable optical disk, or the like (not shown). Each site 110x which may store data also has the ability to transfer data, such as via Storage Area Network switches, hubs, and/or directors, direct fibre channel, SCSI, iSCSI, Infiniband, ATM, IP, or the like connections, encryption means, transcoders, etc (not shown). Each site 110x also includes a control mechanism, such as a private local server, or a shared remote server, or the like (not shown). Note that each site may have a different configuration of equipment, protocols, storage means, and the like, but in any event, some, if not all, of the sites are capable of sending, receiving, and storing data.

These sites 110x and their corresponding storage, transport, and control mechanisms and systems communicate with each other via a network 130. This network may be an Internet/TCP/IP network, an ATM network, a Frame Relay network, optical, electrical, wireless, wired, and the like as are known in the art, and may actually be made up of multiple subnetworks. Every site 110x may not be fully reachable from every other site, but typically there may be a high degree of connectivity between sites. Some sites may be connected intermittently or periodically, e.g., a Pacific fleet shipborne site only when a satellite transponder in a non-geosynchronous orbit passes "overhead."

Figure 1A:
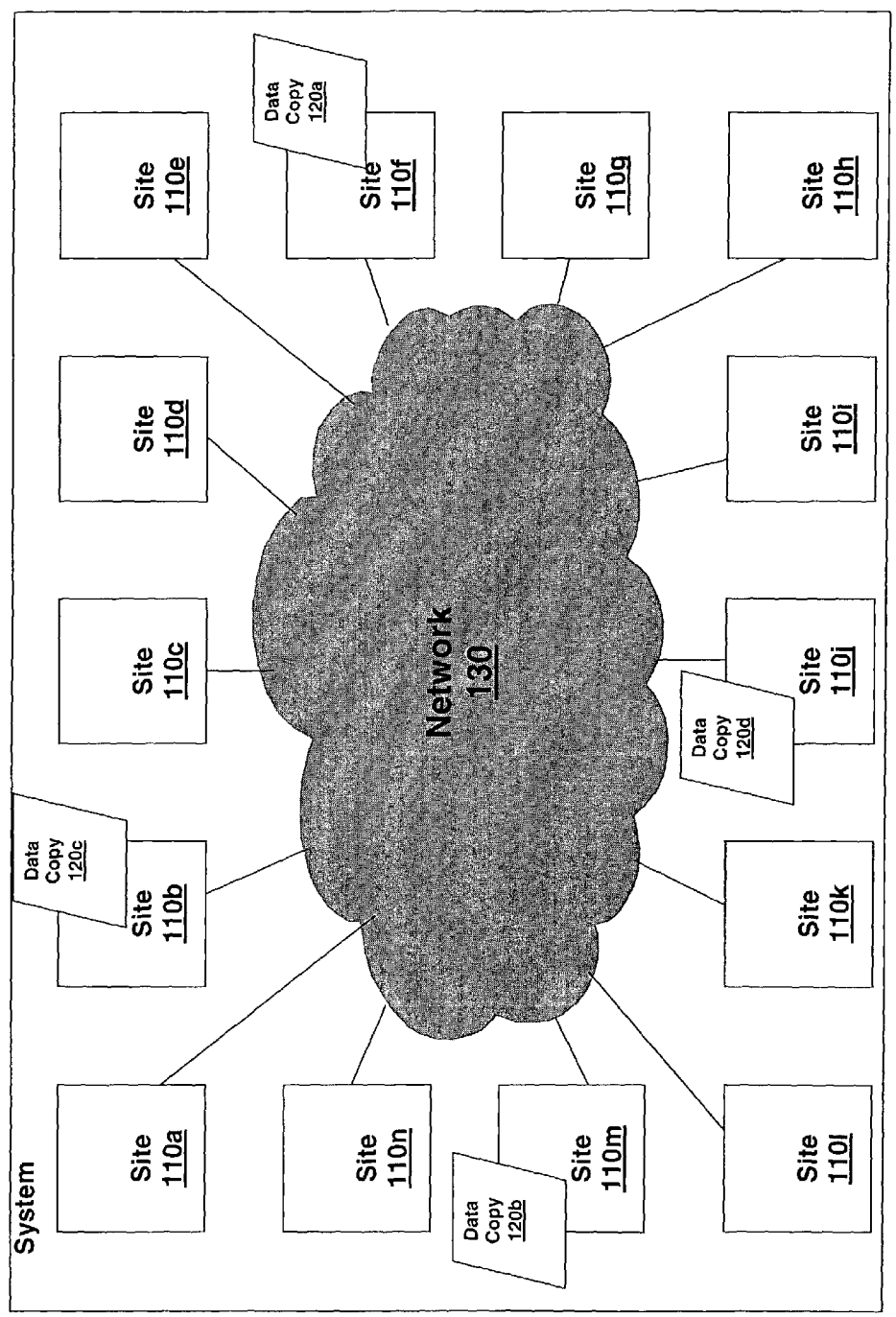
FIG. 1a illustrates an embodiment of a system of the present invention.

Referring still to FIG. 1a, each site 110x, via their storage, transport, and control means, may contain at least one copy of a data object 120y, e.g., 120a, 120b, 120c, and 120d, although the actual number of copies may be greater or lesser. For purposes of this disclosure, a copy or instance of a data object refers to a physically separate but logically equivalent data object, e.g., a file, a record, or the like. Logical equivalency means that differences in block layout, byte size, byte order, disk block size or the like are ignored, subject to the ability of a disk controller, file system, or the like to conduct transcoding.

As shown in FIG. 1a, by example, identical copies of data object 120 are currently resident at four sites: copy 120a resides at site 110f, copy 120b resides at site 110m, copy 120c resides at site 110b, and copy 120d resides at site 110j. As shown in FIG. 1a, only four instances of a single data object are illustrated, however, it is contemplated that the actual number of data objects typically may be higher, and the number of instances may be greater or lesser for any data object.

Figure 1B:
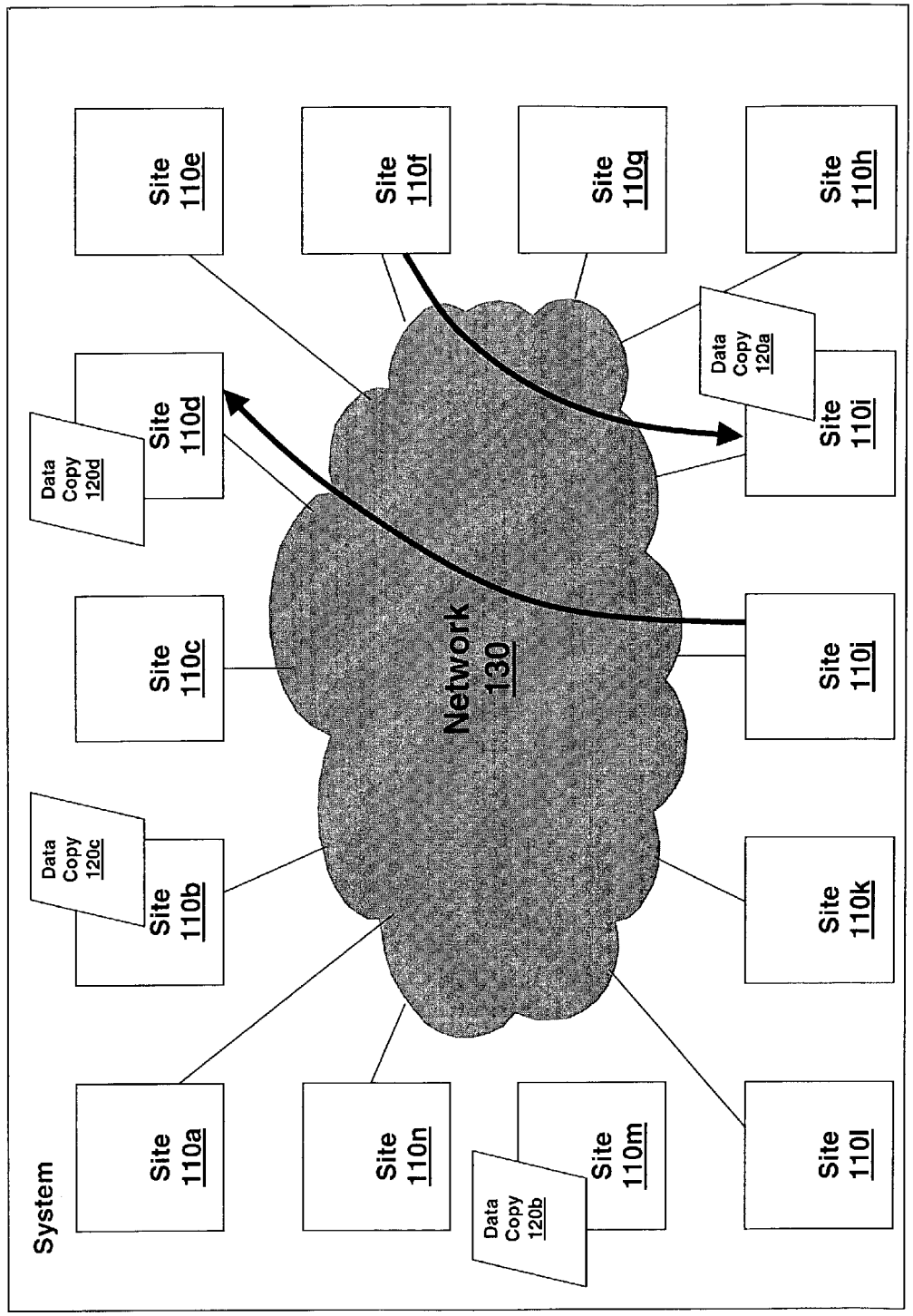
FIG. 1b illustrates another embodiment of a system of the present invention.

Referring now to FIG. 1b, two data moves are illustrated, where data copy 120a has moved from site 110f to site 110i, and data copy 120d has moved from site 110j to site 110d. Again, only four instances of a single data object are illustrated, however it is contemplated that the actual number of data objects typically may be higher, and the number of instances may be greater or lesser for any data object.

Figure 2:
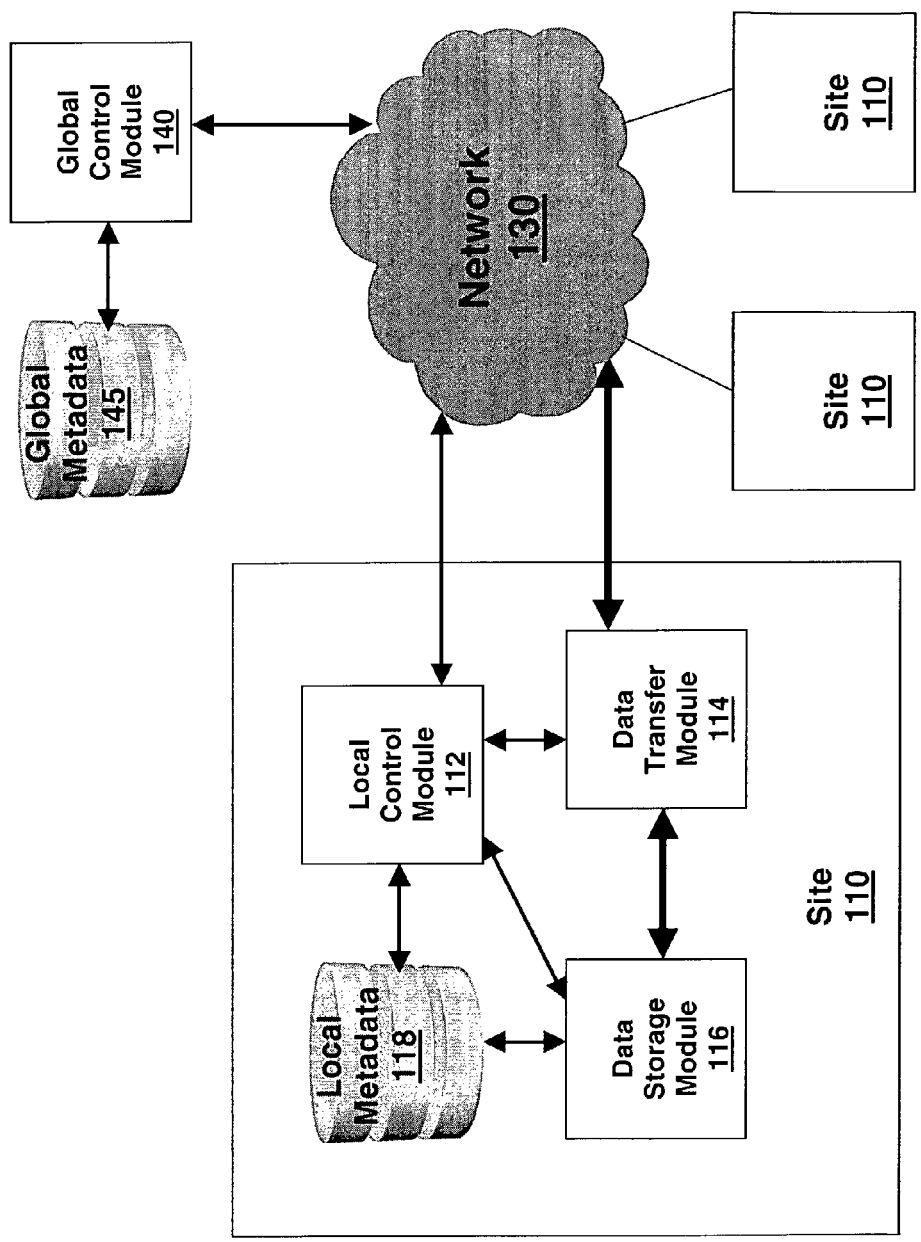
FIG. 2 illustrates exemplary components of a system of the present invention.

Referring now to FIG. 2, there is shown an exemplary selection of components which are provided at a site, such as the sites illustrated and described with respect to FIGS. 1a and 1b. In one embodiment, site 110 may include at least one data transfer module 114, at least one data storage module 116, at least one local control module 112, and at least one local metadata store 118.

Data transfer module 114 interfaces with network 130 to receive data and acknowledgements from other sites and to transmit data and acknowledgements to those sites. Data transfer module 114 typically includes network software, such as a Transmission Control Protocol/Internet Protocol (TCP/IP) stack or Small Computer Systems Interface (SCSI) stack, interface cards such as Gigabit Ethernet Internet Cards (GBICs) or Fibre Channel Host Bus Adapters (HBAs) or the like; routers, switches, bridges, hubs, gateways, directors, and associated optical, and/or electrical cabling or transmitters and receivers, e.g., infrared, 38 GHz, and the like. Data transfer module 114 and other modules may run on a general purpose computer (not shown), but also may run on a dedicated appliance or even within a dedicated intelligent disk array controller. In any case, the role of data transfer module 114 is, responsive to commands from the local control module 112, to shuttle data into the data storage module 116 arriving from other sites 110 across network 130, and, conversely, to shuttle data from data storage module 116 across network 130 to other sites 110, again responsive to local control module 112.

Data storage module 116 typically may be an optical or magnetic disk, disk array, tape silo, tape drive, solid state disk or the like. It may be a single device or array, or a set of such devices directly connected to data transfer module 114, or a set of such devices connected through a Storage Area Network fabric to data transfer module 114, or the like. It may also be simply a portion of memory allocated in a diskless workstation or appliance. In any case, data storage module 116 reliably stores instances of data objects initially, and then stores updated versions as updates are applied. Data objects may also be deleted upon request of the local control module 112.

Local metadata store 118 contains information concerning the data object in general and the specific instance at this site stored in data storage module 116. Such information includes an identifier or some identifying indicia of each data object unique and relevant across the system, such as a filename in the general form of "XXXXXX.YYY." In an environment of interconnected hosts or servers, it may include a network-based host identifier or storage world-wide name, together with file path info as well as the file name, e.g., //123.45.67.89/mydata/importantdata/file.ppt, or //joescomputer/mydata/spread.xls. Such identifiers may be kept for both the primary copy as well as each instance.

Other metadata typically associated with computer data may be contained in local metadata store 118 as well, such as file size, owner access permissions, read-only status, creation date and time, and the like. Finally, metadata required for the operation of the system and method of the present invention are contained in local metadata store 118. This typically may include date and time of arrival/creation of the instance, updates which have been applied, and whether the object is currently "frozen" at the site (i.e., non-relocatable), due to pending updates. Optionally, the last site the instance was located, and even a multiplicity of previous sites where the object had been (i.e., a move history) may be maintained.

Local control module 112 interacts with data transfer module 114, data storage module 116, local metadata 118, and with other sites 110, specifically the local control modules at other sites 110, across network 130. Local control module 112 may also perform other tasks such as updating system clocks, conducting health checks, interacting with monitoring and maintenance systems, and the like, executes the methods of the present invention illustrated in FIGS. 3, 4, and 5 for creating, distributing, moving, updating, deleting, and accessing data objects and their instances. For example, local control module 112 may use data contained in local metadata store 118 to determine an instance to move to another site 110, then communicate across network 130 with other sites 110 to determine one with capacity to store the object instance, then direct data transfer module 114 to move the data object instance from data storage module 116 to the selected site 110.

Optionally, global control module 140 and global metadata store 145 may replace some or all of the functionality of local control module 112 and local metadata store 118 respectively. Global control module 140 and global metadata store 145 may be implemented themselves as a singular entity, or a geographically dispersed loosely coupled entity, e.g., a primary site and recovery site, or as a set of non-local cooperating but independent entities, e.g., a first global control module 140 may control the movement of a first set of data objects and their instances, and a second global control module 140 may control the movement of a second and completely distinct set of data objects and their instances. Such an architecture may arise, e.g., when a first global control module is associated with a first company or division, and a second global control module is associated with a second company or division, and the remaining sites 110, local control modules 112, etc., are shared among both companies or divisions or provided by a public common carrier or service provider.

Figure 3:
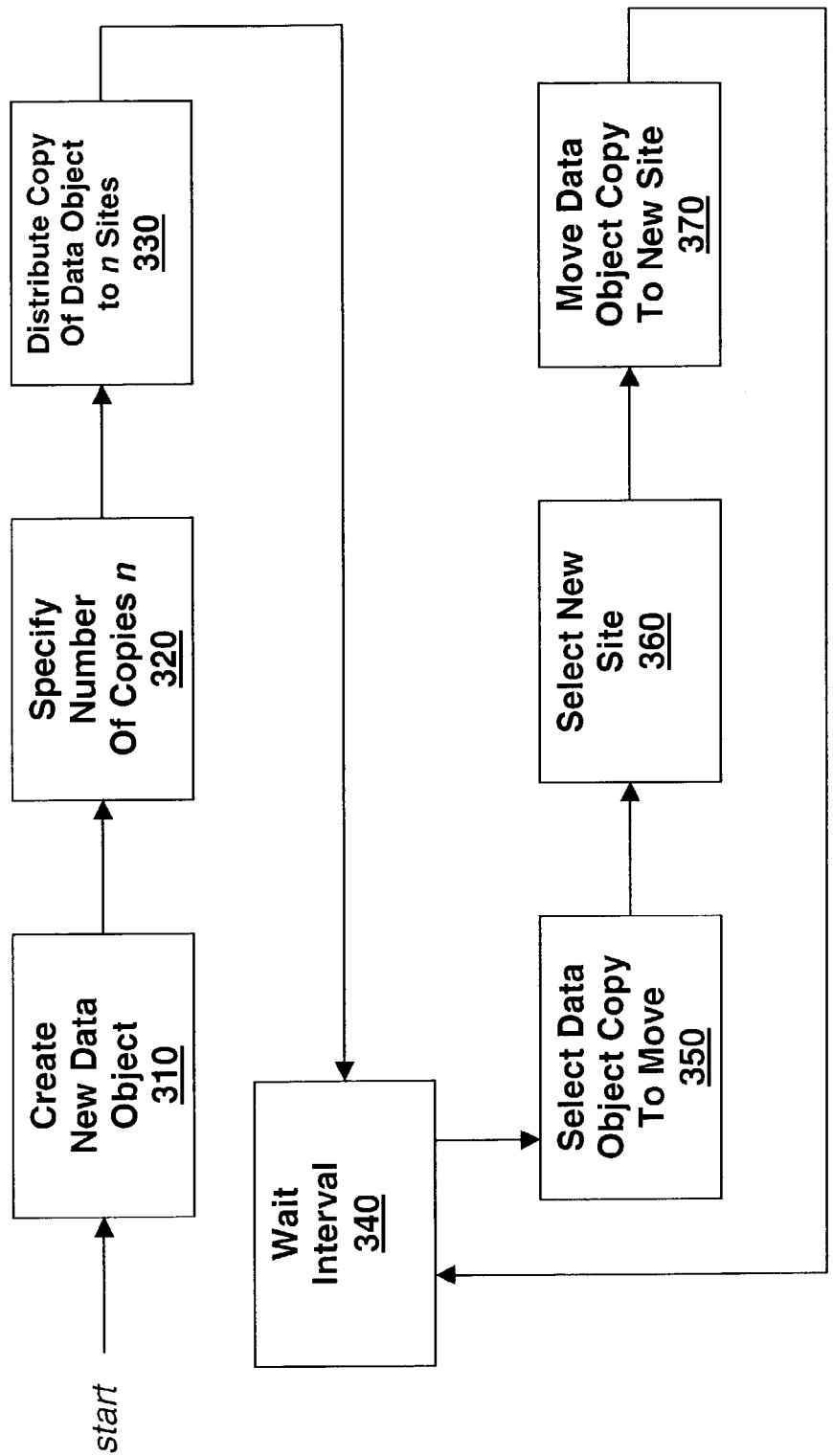
FIG. 3 illustrates a method of the present invention to create and relocate data object instances.

FIG. 3 illustrates an embodiment of a method of the present invention. In step 310, a new data object is created. Alternatively, an existing data object may be identified for use with the system of the present invention if a new data object is not created. In step 320, the number of instances of the data object, call it n, is determined. Note that step 320 may precede step 310, and in fact may be performed only once for all data objects in the system (e.g., each object shall have four instances). In step 330 the data object is copied to n locations. In some embodiments, the primary copy is retained, so that there are actually n+1 instances of the object. In other embodiments, the primary copy is deleted as soon as the object exists in the system, so that there are actually n copies total. In other embodiments, the primary copy is retained, but is subject to movement to another site at a later time in accordance with the principles of the instant invention. In some embodiments, the copying is done using a sequence of n pairwise copies from the originating site. In other embodiments, a first copy may be made from an originating site to a second site via simple replication, with the second site then determining and causing an additional copy to me bade to a third site, and so on. In other embodiments, each site may pick one, two or more sites to further replicate, creating a branching tree of replication activity. In still other embodiments, a multicast protocol may be used across a shared interconnection network. In still other embodiments, a broadcast protocol may be used, with only n sites "listening," or followed by deletions at all excess sites based on which sites successfully received copies. In any case, a predetermined plurality of instances or copies of the data are created in the network.

In step 340, an interval of time passes. In step 350, a particular copy of a data object located at a site is selected. In step 360, a new site is selected. In step 370, the copy of the data is moved from the old site to the new site.

More specifically, at each site containing at least one data item, for all data items or for each item, an interval of time is determined in step 340. This may be the same for each data item at all sites, different for each item at sites, or the same for some data items at some sites and different for some data items at some sites. The interval may be standard, e.g., one hour, or randomly generated each time step 340 is executed. In practice, the steps 340 to 370 illustrated in FIG. 3 typically may take place in parallel at all sites and for all items, or the site may select a next data item to move, and then determine an interval for it, or determine an interval, then determine an item to move, or determine an interval based on characteristics of the item and/or metadata associated with the item, the site from which the move is occurring, the site where a move is planned, or characteristics of the network. In step 350, a data object copy at a particular site is selected to be moved. For example, the least recently moved item may be the next to be moved, or more important items may be moved more frequently, or items may be moved more frequently when the network is less congested, or some combination of these. In practice, step 350 may be conducted before step 340, even steps 350 and 360 may be conducted before step 340. Or, part of step 340, determining an interval to wait, may be conducted before steps 350 and 360, and then the rest of step 340, actually waiting that long, may be executed after steps 350 and 360. Step 360 may also precede step 350. One advantage of the step order shown is that the site selected will be able to accept a copy of a data object of a size which is determined as part of step 350, and such information will be as current as possible.

In step 360 a new site is selected. Such a site may be based on a predetermined rule, e.g., data items from site A may always move to site B, and data items from site B may always move to site C, and so on. Or, the new site may be randomly selected, i.e., any reachable site may be chosen. Or, the new site may be selected based on metadata characteristics of the site, data item, or network, e.g., site storage capacity utilization, network congestion, network transport costs, and so on. For example, a move to site B may wait until there is sufficient capacity. Or, a move from site A to site B may wait until the bandwidth interconnecting the sites is at lower than 70% utilization, and so forth.

In step 370, the data item is transferred from the old site to the new site. Typically, this may include copying the item from the old site to the new site, then deleting the copy at the old site after receiving acknowledgement that the copy has successfully been received at the new site. Such acknowledgement can be based on positively confirming receipt of the entire object or each of a sequence of packets constituting the object based on techniques such as error detection and correction code such as a cyclic redundancy codes, checksums or other means as are known in the art. In a variation of the above, transferring the item from a first site to a second site may be conducted by identifying another instance of the item at a third site, copying it from the third site to the second site, and then deleting it at the first site. This has the same result, but may be used under some circumstances, e.g., due to network congestion.

In practice, steps 360 and 370 may be conducted in a tightly coupled fashion, wherein in step 360 as part of the process of selecting a new site, a slot is reserved for the instance at the new site. This way, it may be ensured that, first of all, space is still available for the instance, and secondly, that another instance is not simultaneously moved to the site due to the concurrent execution of step 360 at two different sites that identify the same site as the destination site for step 370.

Figure 4:
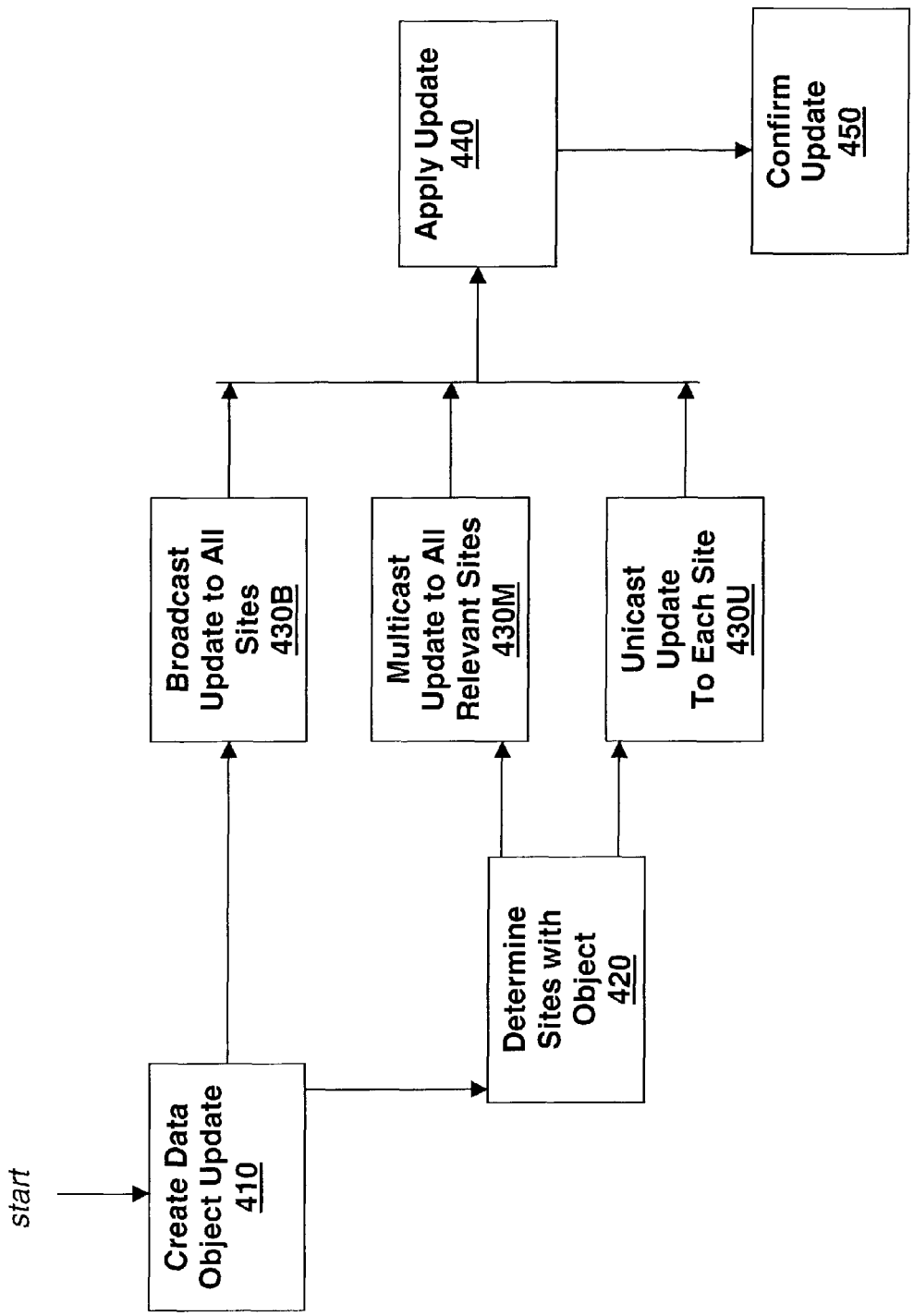
FIG. 4 illustrates another embodiment of a method of the present invention to update or delete all instances of a data object.

FIG. 4 illustrates a method of the present invention for updating all instances of a data object. For purposes of the present invention, a deletion may be considered to be a form of updating. In step 410, an update to a data object is created. This may be a changed block in a file, a new or changed record in the database, and the like. In one embodiment, in step 430B, this update is then communicated to all sites in the system of the present invention, whether they have the object or not. In an alternate embodiment, in step 420, it is first determined which sites have an instance of the data object. Then, in step 430M, the update is multicast to the sites, or, in step 430U the update is unicast to each site. In any case, whether broadcast 430B, multicast 430M, or unicast 430U, the updates reach the sites with the data object. In step 440 each site with an instance of the data object applies the update. Then, in step 450, each site with an instance of the data object acknowledges that the data object has been updated. In some embodiments, a deletion or change will immediately impact the instance. In others, a local copy is made and archived for some period before a deletion, change, or move (and hence local deletion), as an additional measure of data protection. In some embodiments, only the change is transmitted (e.g., delta block transfer). In others, a new version of the entire object is distributed, and after confirmation of success in such distribution, the earlier version and all of its instances are deleted or marked for deletion.

If step 420 and therefore also step 430M or step 430U are executed, it will be apparent that there could be conflict between a relocation process and an update distribution process. In one embodiment, periods of relocation are alternated with periods of updating, so that relocation and updating are never concurrently executed. In another embodiment, metadata concerning object instances that have been recently moved are maintained for a period after the instance has been deleted, and updates are forwarded to the new instance location. In another embodiment, execution of step 420 is conducted by querying all sites to respond whether they have the object and if so, to prepare for an update. If they respond positively, they suspend object instance relocation until the update has arrived, been applied, and been confirmed. Many variations are within the scope of the present invention, and depend partly on whether there is a central metadata repository with information on object instance location. This, and other communications between sites, may be typically encrypted to prevent a hostile agent from identifying the sites containing the data.

Figure 5:
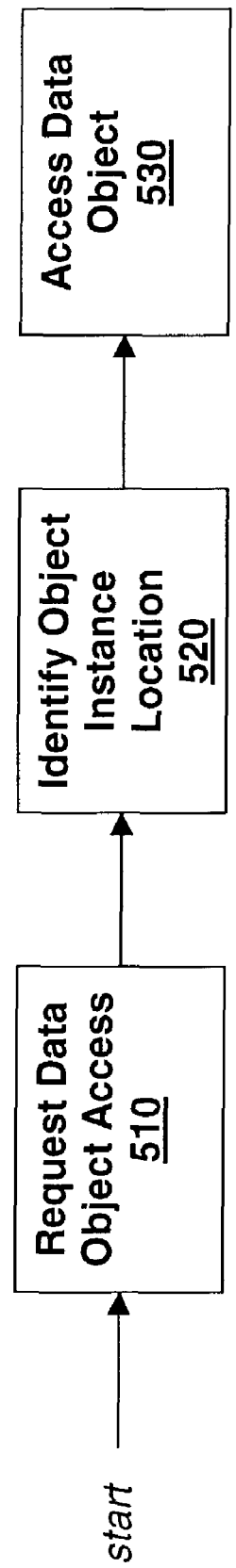
FIG. 5 illustrates another embodiment of a method of the present invention to access an instance of a data object.

FIG. 5 illustrates a method of the present invention for accessing objects. Briefly, in step 510, a data object is requested for access. In one embodiment, a data object may be requested for access by conducting a "file open" for access to the data object. In step 520, an instance of the object is located. In one embodiment, a primary copy is always retained at the original site, so this is a trivial operation. In alternate embodiments, the primary copy may have been deleted, so this step may include either looking up an object instance location in a global metadata directory, broadcasting a query to all locations as to whether they have the object, which in turn would cause a lookup in a local metadata directory, or conducting some kind of search, e.g., sequential, breadth first, depth first or the like through the network to identify a location. Techniques to minimize access time are known in the art of content distribution and content management, and may be utilized here. For example, the location of an object instance with the lowest latency or number of hops may be selected. Typically, the object would then be frozen at that location, and then in step 530, the object would be accessed.

While the present invention has been described with reference to preferred and exemplary embodiments, it will be understood by those of ordinary skill in the art that various changes may be made and equivalents may be substituted for elements thereof without departing from the scope of the invention. For example, link encryption, retransmission, firewalls, intrusion detection systems and honeypots, virtual private networks, and data object encryption may be utilized to ensure security, privacy, and authentication of transactions such as data object updates, or filter the system from spoof transactions which cause denial of service by filling up all available storage capacity at the site. Dummy transactions may be utilized to create the illusion of data being moved from one site to another, when actually the data is actually being moved to a different site. This would prevent eavesdroppers from using statistics associated with encrypted traffic to determine where a data object was being moved. On the other hand, for a fully private network, such elements need not be used in combination with the system.

In addition, many modifications may be made to adapt a particular situation or material to the teachings of the invention without departing from the scope thereof. Therefore, it is intended that the invention not be limited to the particular embodiment disclosed, but that the invention will include all embodiments falling within the scope of the appended claims.

What is claimed is:

1. A method comprising:
    receiving a data item for storage;
    determining a replication count for the data item;
    storing the data item in a plurality of randomly selected storage sites within a collection of storage sites, the plurality of randomly selected storage sites equal to the determined replication count;
    intermittently varying a location of the data item within one or more storage sites within the collection of storage sites; and
    performing dummy transactions for creating an illusion of moving the data item from a first storage site in the collection of storage sites to a second storage site in the collection of storage sites without so moving the data item.

2. The method of claim 1, wherein the data item is an update of existing data already stored on a storage site.

3. The method of claim 1, wherein the location of the data item is varied in a random fashion.

4. The method of claim 1, further comprising:
    updating the data item within the storage sites.

5. The method of claim 1, wherein the storage sites are geographically remote relative to one another.

6. The method of claim 1, wherein a storage site which is selected for the data item never receives the same data item for storage within a predetermined time period.

7. The method of claim 1, further comprising
    moving said data item to a storage site in the collection of storage sites other than either said first storage site or said second storage site.

* * * * *